United States Patent [19]

Norimatsu et al.

[11] E Re. 29,741

[45] Reissued Aug. 22, 1978

[54] AIR-FUEL RATIO FEED BACK TYPE FUEL INJECTION CONTROL SYSTEM

[75] Inventors: Hideaki Norimatsu, Kariya; Susumu Harada, Oobu, both of Japan

[73] Assignee: Nippondenso Co., Ltd., Kariya, Japan

[21] Appl. No.: 780,644

[22] Filed: Mar. 23, 1977

Related U.S. Patent Documents

Reissue of:

[64] Patent No.: 3,916,170
Issued: Oct. 28, 1975
Appl. No.: 463,369
Filed: Apr. 23, 1974

[30] Foreign Application Priority Data

Apr. 25, 1973 [JP] Japan ..... 48-47486
Jun. 28, 1973 [JP] Japan ..... 48-73454

[51] Int. Cl.[2] ..... G06G 7/70; F02M 7/00
[52] U.S. Cl. ..... 364/431; 123/32 EA
[58] Field of Search ..... 235/150.2, 150.21, 151.34; 123/32 AE, 32 EA

[56] References Cited

U.S. PATENT DOCUMENTS

| | | | |
|---|---|---|---|
| 3,643,635 | 2/1972 | Milam | 123/32 EA |
| 3,736,910 | 6/1973 | Raff | 123/32 EA |
| 3,782,347 | 1/1974 | Schmidt et al. | 123/32 EA X |
| 3,789,816 | 2/1974 | Taplin et al. | 123/32 EA |
| 3,809,028 | 5/1974 | Luchaco | 123/32 EA |
| 3,815,561 | 6/1974 | Seitz | 235/150.21 X |

OTHER PUBLICATIONS

J. G. Rivard, "Closed-Loop Electronic Fuel Injection Control of the Internal-Combustion Engine", Society of Automotive Engineers, International Automotive Engineering Congress, Jan. 8-12, 1973, pp. 1-9.

*Primary Examiner*—Jerry Smith
*Attorney, Agent, or Firm*—Cushman, Darby & Cushman

[57] ABSTRACT

A fuel injection control system comprising an air-fuel ratio feedback control in combination with an electronically controlled fuel injection system. In this system, the concentration of oxygen contained in the engine exhaust gases is compared with a predetermined value in a comparator whereby whether the fuel injection quantity is to be corrected in a direction to increase it or in a direction to decrease it is determined in accordance with the output of the comparator, and the rate of change of the correction is controlled in accordance with a sum output produced by adding a detected value of engine rpms and a detected value of engine intake state. When the air-fuel control cannot operate properly, for example because of a low exhaust temperature or under deceleration conditions, a holding circuit is connected to the integrater output to maintain the integrated output at a value intermediate the fluctuating range thereof. The system has an excellent follow-up characteristic to respond to rapid changes in the operating conditions of an engine and it is capable of maintaining the air-fuel mixture ratio at a predetermined value.

22 Claims, 6 Drawing Figures

AIR-FUEL RATIO FEED BACK TYPE FUEL INJECTION CONTROL SYSTEM

Matter enclosed in heavy brackets [ ] appears in the original patent but forms no part of this reissue specification; matter printed in italics indicates the additions made by reissue.

*RELATED CASE*

*This is a reissue of our U.S. Pat. 3,916,170 granted Oct. 28, 1975.*

BACKGROUND OF THE INVENTION

1. Field of the Invention

The present invention relates to a fuel injection control system which provides an additional air-fuel ratio feedback control for an electronically controlled fuel injection system.

2. Description of the Prior Art

Fuel injection systems are known in the art in which the amount of air drawn into an engine is measured, and the amount of fuel predetermined in relation to the measured air quantity is programmed in terms of the injection time of electromagnetic valves, whereby the fuel injection quantity is regulated in accordance with the program.

A disadvantage of fuel injection systems of this type is that while various engine parameters such as the intake manifold vacuum and engine temperatures may be detected to control the fuel injection quantity, it is extremely difficult to correct for constantly changing operating conditions of the engine, the variations according to the type of engine, i.e., the variations with different engines, etc., and this particularly gives rise to serious difficulties when the vehicle is equipped with a catalytic exhaust gas cleaning system or the like for exhaust emission control purposes.

SUMMARY OF THE INVENTION

With a view to overcoming the foregoing difficulty, it is an object of the present invention to provide an air-fuel ratio feedback type fuel injection control system wherein the concentration of oxygen contained in the exhaust gases is detected by a sensor to correct the fuel injection quantity in accordance with the sensor output, and the feedback follow-up characteristic of the system during transient periods is improved, whereby permitting the engine to operate at a predetermined air-fuel mixture ratio.

In accordance with the present invention, there is thus provided an air-fuel ratio feedback type fuel injection control system comprising a comparator for comparing the detected output of an oxygen concentration sensor with a predetermined value, an adding circuit for adding a detected value of intake state and a detected value of engine rpms to produce a sum output, and correction means for determining the sense of correction in accordance with the output of the comparator and generating an error output having a correction factor varied in accordance with the sum output. A great advantage of this arrangement is that since the sense of correction is determined in accordance with the comparator output, the air-fuel mixture ratio indicated by the concentration of oxygen in the exhaust gases which is detected by the oxygen concentration sensor is controlled to a predetermined value, and moreover the correction factor of the error output is controlled in accordance with the sum output of the detected values of the intake state and engine rpms to thereby ensure improved feedback follow-up characteristic during transient perieds when the operating conditions of the engine vary over a wide range or rapidly.

When the air-fuel control cannot operate properly, for example because of a low exhaust temperature or under deceleration conditions, a holding circuit is connected to the integrater output to maintain the integrated output at a value intermediate the fluctuating range thereof.

In accordance with another form of the invention, the system further comprises stopping means for terminating the correction of the fuel injection quantity by the feedback control system when the supply of fuel is cut off during the deceleration periods. A great advantage of this arrangement is that by stopping the correction of the fuel injection quantity under the deceleration driving conditions, it is possible to eliminate the danger of supplying an abnormally rich mixture when the fuel injection is started again upon termination of the deceleration driving conditions.

DESCRIPTION OF THE PREFERRED EMBODIMENTS

The present invention will now be described in greater detail with reference to the illustrated embodiments.

Figure 1:
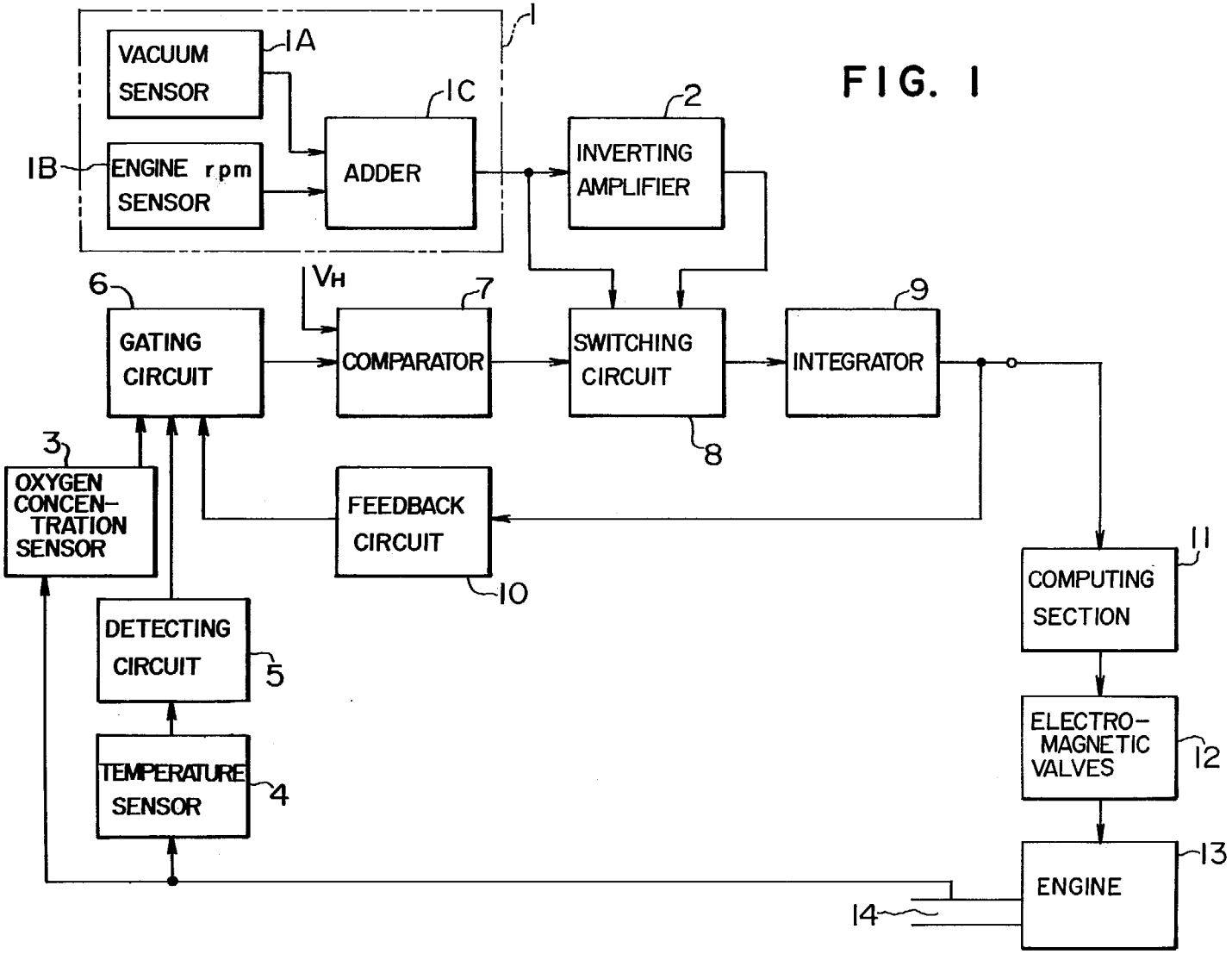
FIG. 1 is a block diagram showing an embodiment of an air-fuel ratio feedback type fuel injection control system according to the present invention.

Referring first to FIG. 1 showing a first embodiment of the invention, numeral 1 designates an integration constant generating adding circuit wherein the engine rpm, intake manifold vacuum, inlet air quantity, etc. may be detected, and the detected voltage is converted into an error from a reference voltage $V_B/2$ having half the value of a supply voltage to produce a negative voltage integration constant output (the voltage smaller than the reference voltage $V_B/2$ is hereinafter designated as a negative voltage and the greater one as a positive voltage). Numeral 1A designates a vacuum sensor for generating a vacuum voltage corresponding to the intake manifold vacuum representing the intake state, 1B an rpm sensor for generating an rpm voltage corresponding to the number of revolutions of an engine, 1C an adder for producing the sum of the vacuum voltage and the rpm voltage. Numeral 2 designates an inverting amplifier for inverting the integration constant with respect to the reference voltage $V_B/2$ to generate a positive voltage inverted output. Numeral 3 designates an oxygen concentration sensor consisting of a solid electrolyte such as zirconium oxide which is mounted in an exhaust pipe 14 to detect the concentration of oxygen in the exhaust gases, whereby when the exhaust gas temperature exceeds an allowable temperature in the range between 450° to 600° C, the sensor comes into normal operation in response to the oxygen concentration and generates a concentration detecting signal. Numeral 4 designates a temperature sensor consisting of a thermistor for detecting the exhaust gas temperature 5, an allowable temperature detecting circuit responsive to the output signal of the temperature sensor 4 for generating an output when the exhaust gas temperature reaches the allowable temperature. Numeral 6 designates a gating circuit whereby in the absence of the output signal from the allowable temperature detecting circuit 5, that is, when the exhaust gas temperature is lower than the allowable temperature, the circuit is closed to prevent the passage of the concentration signal from the oxygen concentration sensor 3, whereas when the detecting circuit 5 generates an output, the circuit is opened to permit the concentration signal to pass therethrough. Numeral 7 designates a comparator for normally comparing the concentration signal from the oxygen concentration sensor 3 with a predetermined air-fuel ratio setting value $V_H$ to generate a 1 or 0 level output signal. Numeral 8 designates a switching circuit responsive to the output signal of the comparator 7 for determining the sense of correction to pass to the output thereof either the negative voltage integration constant from the integration constant generating adding circuit 1 or the positive voltage inverted output from the inverting amplifier 2. Numeral 9 designates an integrator for integrating the negative voltage integration constant or the positive voltage inverted output to vary the correction factor thereof. The fuel injection quantity is corrected in accordance with the output of the integrator 9. Numeral 10 designates an output holding feedback circuit which constitutes a correction stopping means and by which the output of the integrator 9 is received as an input and fed back through the gating circuit 6 when there is no output from the allowable temperature detecting circuit 5, whereby the output of the integrator 9 is held at the reference voltage $V_B/2$ to stop the correction of the fuel injection quantity. Numeral 11 designates the computing section of a conventional electronically controlled fuel injection control system for generating injection pulses having a time duration corresponding to an engine parameter such as the intake manifold vacuum or engine temperature, whereby the time duration of the injection pulses is corrected in accordance with the difference between the integrated output of the integrator 9 and the reference voltage $V_B/2$. Numeral 12 designates electromagnetic valves which are opened by the injection pulses from the computing section 11 to inject the required fuel quantity, 13 an internal combustion engine, 14 the exhaust pipe of the engine 13.

With the construction described above, the operation of the first embodiment is as follows. The system is prearranged so that when the integrated output of the integrator 9 becomes equal to the value of the reference voltage $V_B/2$, the amount of correction by the feedback control system which applies feedback in accordance with the oxygen concentration of the exhaust gases is reduced to zero and a predetermined basic fuel quantity required is injected. Assuming now that the exhaust gas temperature is below the allowable detecting temperature, the oxygen concentration sensor 3 does not respond and thus it produces no output. This situation corresponds to a weak mixture detecting condition so that the output signal of the allowable temperature detecting circuit 5 acts in such a manner that the gating circuit 6 prevents the passage of the output of the oxygen concentration sensor 3. In other words, the temperature sensor 4 and the allowable temperature detecting circuit 5 detects that the exhaust gas temperature is below the allowable temperature and thus an output for actuating the gating circuit 6 is generated. Consequently, the output holding feedback circuit 10 comes into operation to maintain the integrated output of the integrator 9 at the value of the reference voltage $V_B/2$ and the computing section 11 generates the injection pulses corresponding to the basic fuel requirement to inject and supply the fuel into the engine 13 through the electromagnetic valves 12.

On the other hand, when the exhaust gas temperature exceeds the allowable temperature, the oxygen concentration sensor 3 operates in response to this temperature and the gating circuit 6 opens to pass the output signal of the oxygen concentration sensor 3. In this condition, if the oxygen concentration of the exhaust gases is high and the mixture is weak, the concentration detecting signal from the oxygen concentration sensor 3 is at the low level and this low level output signal is applied to the comparator 7 through the gating circuit 6. Consequently, the comparator 7 compares this signal with the air-fuel ratio setting value $V_H$ and generates a 0 level signal which is utilized to cause the switching circuit 8 to perform the selecting function and thereby to introduce the positive voltage inverted output of the inverting amplifier 2 into the integrator 9. As a result, the integrator 9 integrates this inverted output and generates an integrated output voltage which decreases gradually. In response to this integrated output voltage, the time duration of the injection pulses from the computing section 11 is increased and an increased amount of fuel is injected to supply an enriched mixture. Continuation of this process causes the oxygen concentration of the exhaust gases to decrease gradually. When the oxygen concentration eventually drops to a predetermined value, the output signal of the oxygen concentration sensor 3 goes to the high level and this high level output signal is applied to the comparator 7 by way of the gating circuit 6. When this high level signal becomes higher than the air-fuel ratio setting value $V_H$, the 1 level signal from the comparator 7 causes the selecting operation of the switching circuit 8 to introduce the sum output or the negative voltage integration constant output of the adding circuit 1 into the integrator 9. The integrator 9 integrates this integration constant output and generates an integrated output voltage which rises gradually. This integrated output voltage decreases the time duration of the injection pulses from the computing section 11 and the fuel injection quantity is decreased to control the oxygen concentration to approach a predetermined value which corresponds to the optimum air-fuel mixture ratio. Further, in the above-described feedback control, the integration constant output by which the air-fuel mixture ratio or the oxygen concentration at the higher exhaust gas temperature than the allowable temperature is controlled to the predetermined value, is the sum output from the added 1C which produces the sum of the output voltages of the vacuum sensor 1A and the rpm sensor 1B. In this way, any time delay due to the influence of the velocity of exhaust gases or the response speed of the oxygen concentration sensor 3 during the time between the correction of the fuel injection quantity and the response of the sensor 3 is compensated for. In other words, when the amount of air drawn into the engine is increased greatly or in the high engine rpm ranges, the value of the integration constant is increased to increase the absolute value for the slope of the integrator output, whereas when the inlet air quantity is decreased greatly or in the low engine rpm ranges, the value of the integration constant is decreased to decrease the absolute value for the slope of the integrator output. In this way, it is possible to improve the control response characteristic of the feedback control system which maintains the air-fuel mixture ratio at a predetermined value during transient periods when the engine operating conditions change rapidly or over a wide range.

Figure 2:
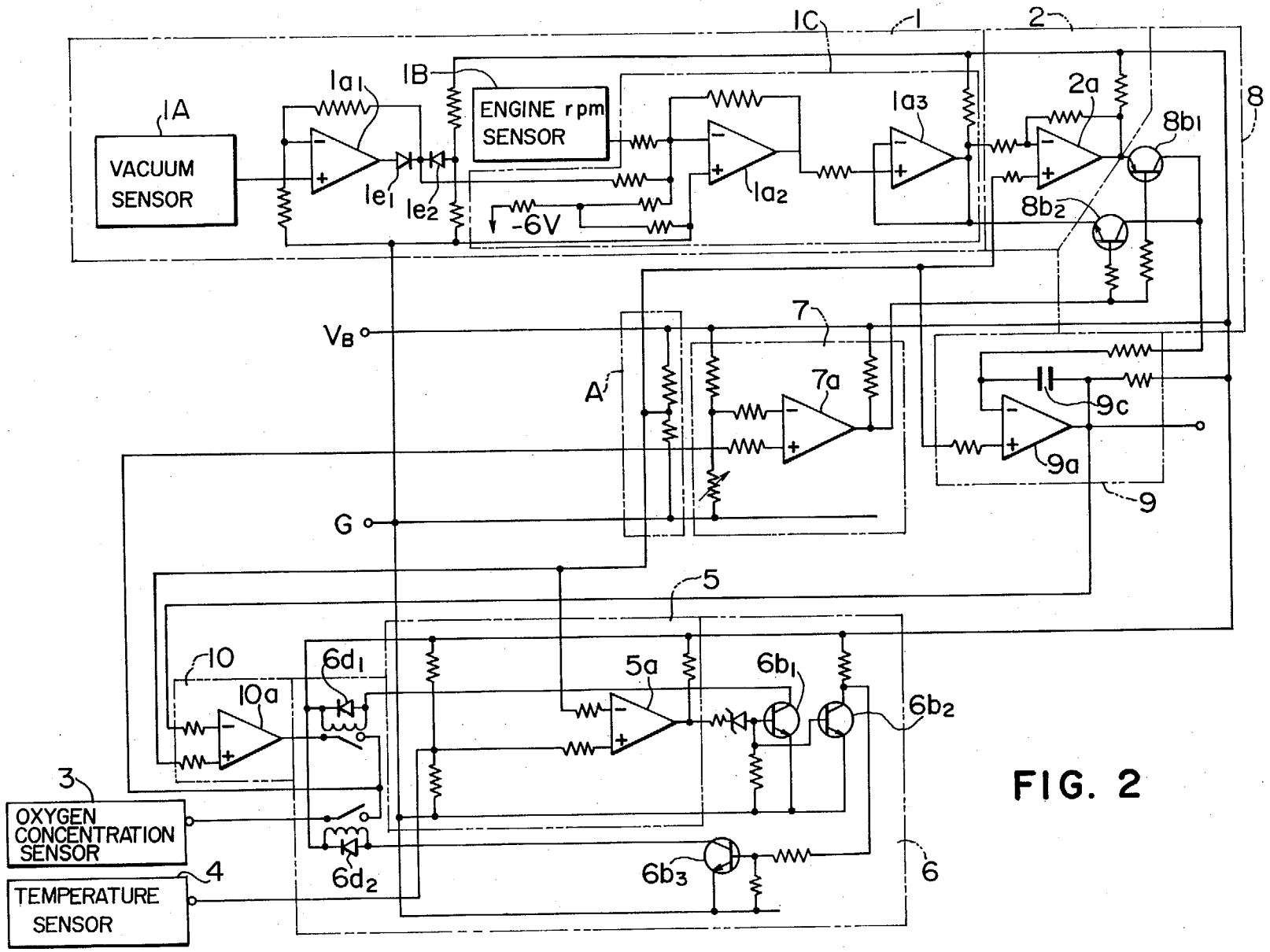
FIG. 2 is a wiring diagram showing a detailed circuit diagram of the principal part of the embodiment shown in FIG. 1.

FIG. 2 shows the principal individual circuits of the embodiment which perform the abovedescribed operations. In FIG. 2 showing the individual circuits designated by numerals 1 through 10 in FIG. 1, numerals $1a_1$, $1a_2$, $1a_3$, 2a, 5a, 7a, 9a and 10a designate operational amplifiers, $1e_1$ and $1e_2$ diodes, $6b_1$, $6b_2$, $6b_3$, $8b_1$ and $8b_2$ transistors, 9c and integrating capacitor, $6d_1$ and $6d_2$ relays, $V_B$ a supply terminal to which a positive voltage is applied, G a grounding terminal, A a voltage divider for reducing the supply voltage to one half to supply the reference voltage $V_B/2$ to the circuits 2, 5, 9 and 10.

Figure 3:
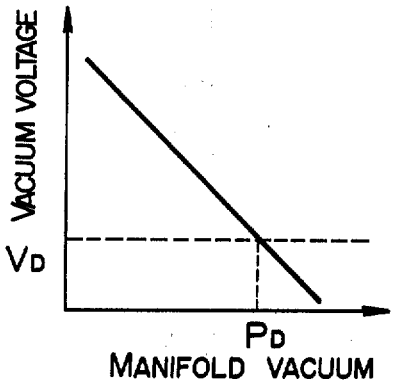
FIG. 3 is an input-output characteristic diagram of the manifold vacuum sensor in the system of FIG. 2.
Figure 4:
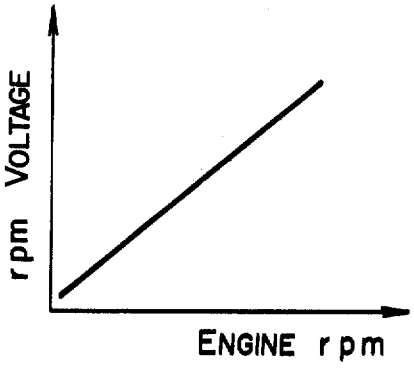
FIG. 4 is an input-output characteristic diagram of the engine rpm sensor in the system of FIG. 2.
Figure 5:
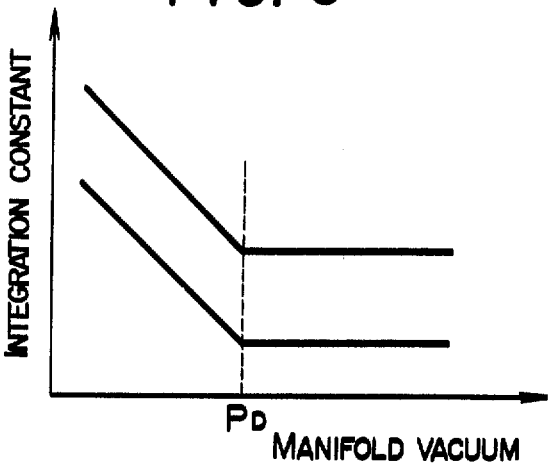
FIG. 5 is an input-output characteristic diagram of the adding circuit in the system of FIG. 2.

FIG. 3 illustrates an intake manifold vacuum versus vacuum voltage characteristic diagram showing the input-output characteristic of the vacuum sensor 1A. In FIG. 3, designated as $P_D$ is a critical vacuum for preventing the integration constant from decreasing excessively when the intake manifold vacuum increases greatly, whereby when the manifold vacuum exceeds the critical vacuum, the vacuum voltage is clamped to an anode voltage $V_D$ of the diode $1e_2$. In FIG. 4, there is illustrated an engine rpm versus rpm voltage characteristic diagram showing the input-output characteristic of the rpm sensor 1B. In FIG. 5, there is illustrated an intake manifold vacuum versus integration constant characteristic diagram using the engine revolutions of the adding circuit 1 as an parameter. With the integration constants according to this characteristic diagram, the above-described correction of the fuel injection quantity with improved response characteristic during transient periods is ensured.

Figure 6:
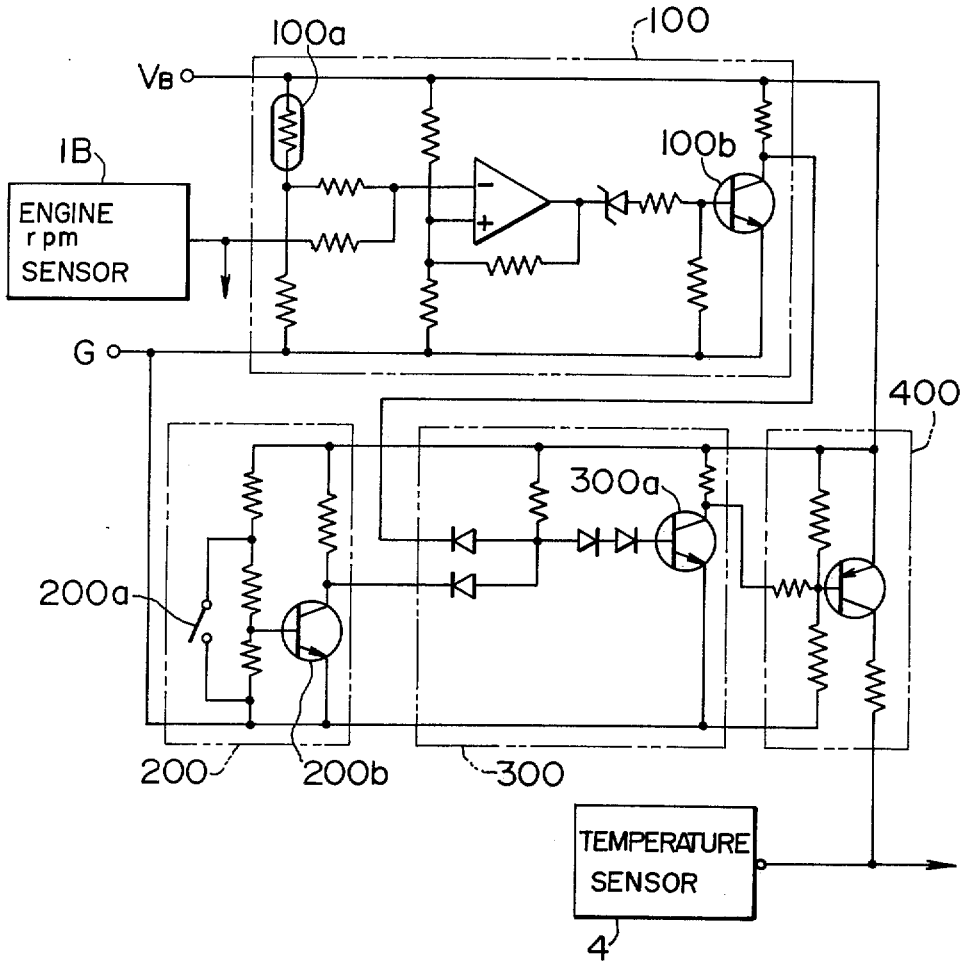
FIG. 6 is a wiring diagram showing a detailed circuit diagram for the principal part of another embodiment of the invention.

Referring now to FIG. 6, there is illustrated a wiring diagram showing the principal circuits of another embodiment of the system according to the invention. The circuits constitute second stopping means whereby the correction of the fuel injection quantity by the feedback control system is terminated when the supply of fuel is cutoff during deceleration periods. In FIG. 6, numeral 100 designates a cutoff condition sensor whereby when the sum of the outputs of a thermistor 100a for detecting the coolng water temperature and the engine rpm sensor 1B exceeds a predetermined value, a transistor 100b is turned off to generate a cutoff condition signal. Numeral 200 designates a cutoff switch circuit whereby when the accelerator pedal is released for deceleration driving, a cutoff switch 200a is closed and a transistor 200b is turned off to generate a cutoff switch signal. Numeral 300 designates an AND circuit whereby when both cutoff condition signal and the cutoff switch signal are on, a transistor 300a is turned off to generate a cutoff signal. Numeral 400 designates a cutoff signal conversion circuit whereby when the cutoff signal is generated, the output voltage of the temperature sensor 4 is raised to forcibly create a condition which indicates that the engine temperature is lower than the allowable temperature.

With the construction described above, when the supply of fuel is cutoff, the exhaust gas temperature is high, the oxygen concentration sensor 3 is in the normal operating condition and there is no injection of fuel. Consequently, the oxygen concentration sensor 3 continues to generate the low level output signal indicative of the fact that the concentration of oxygen contained in the exhaust gases is high and the mixture is weak. In this case, therefore, the feedback control system serves in such a manner that the amount of correction of the fuel injection quantity for enriching the mixture is prevented from increasing abnormally. In other words, during deceleration due to the releasing of the accelerator pedal, the cutoff condition sensor 100 generates a cutoff condition signal and the cutoff switch circuit 200 generates a cutoff switch signal with the result that the AND circuit 300 generates a cutoff signal. This cutoff signal brings the cutoff signal conversion circuit 400 into operation to forcibly raise the output voltage of the temperature sensor 4. Consequently, the output voltage of the sensor 4 indicates that the engine temperature is lower than the allowable temperature, and thus the output of the integrator 9 is held at the reference voltage $V_B/2$ and the correction of the fuel injection quantity is stopped through the action of the previously mentioned allowable temperature detecting circuit 5, the gating circuit 6 and the output holding feedback circuit 10. The cutoff signal generating means shown in FIG. 6 and comprising the cutoff condition sensor 100, the cutoff switch circuit 200 and the AND circuit 300 is incorporated in the computing section 11 of the conventional electronically controlled fuel injection control system. In this case, therefore, it is necessary to add only the cutoff signal conversion circuit 400 to the circuitry of FIG. 2 and the circuit construction of this embodiment is thus greatly simplified.

Further, while, in the second embodiment described above, the second stopping means is designed to forcibly raise the output voltage of the temperature sensor 4, it is of course possible to use other means such as operating the gating circuit 6 with the cutoff signal.

We claim:

1. An air-fuel ratio feedback type fuel injection control system comprising a main feedback circuit and a holding means; said main feedback circuit including:

an oxygen concentration sensor for detecting the concentration of oxygen contained in the exhaust gases of a vehicle internal combustion engine;

a comparator for comparing the output of said oxygen concentration sensor with a first predetermined value to generate an output;

an adder circuit for adding at least a first detected value representing an intake state in said engine and a second detected value of the number of revolutions of said engine and generating a sum output thereof;

an inverter connected to said adding circuit to generate an inverted output of said sum output;

a switching circuit connected to said comparator, said adder circuit and said inverter and responsive to the output of said comparator for selecting and generating either of said sum output and said inverted output as an output thereof;

an integrating circuit connected to said switching circuit for integrating the output of said switching circuit to generate an integrated output;

an electronically controlled fuel injection means connected to said integrating circuit and said engine and adapted for injecting a fuel amount corresponding to at least one of operating parameters of said engine, whereby fuel amount to be injected is corrected in accordance with the output of said integrating circuit; and said holding means being connected to said integrating circuit and said fuel injection means, and maintaining said integrated output at a second predetermined value except upper and lower saturation values of said integrated output when the correction of the injection fuel amount by said main feedback circuit is terminated.

2. An air-fuel ratio feedback type fuel injection system according to claim 1, wherein said second predetermined value is set at a substantial midpoint of the fluctuating range of said integrated output.

3. A fuel injection control system including a computing section for computing an optimum amount of fuel to be injected in accordance with parameters concerning operational conditions of an internal combustion engine in a vehicle, and fuel supplying means for injecting the fuel into said internal combustion engine in response to an output of said computing section, said computing section comprising:

a. a main feedback circuit including air-fuel ratio detecting means for measuring an air-fuel ratio of gas mixture by detecting at least one component of exhaust gases of an internal combustion engine; integration constant generating means for generating a positive integration constant and a negative integration constant; selecting means connected to said air-fuel ratio detecting means and said integration constant generating means for selecting, in response to the output of said air-fuel ratio detecting means, one of said positive and negative constants in accordance with the output of said air-fuel ratio detecting means; and an integrating circuit connected to said selecting means for integrating said one of said positive and negative constants selected by said selecting means to produce an integrated output, thereby correcting the fuel amount to be injected; and b. holding means connected to said integrating circuit for maintaining the integrated output of said integrating circuit in said main feedback circuit at a predetermined value intermediate within a fluctuating range of said integrated output when there occurs in said internal combustion engine a condition that the correction function of the fuel amount by said integrating circuit in said main feedback circuit is terminated.

4. A fuel injection control system according to claim 3, wherein said holding means includes condition detecting means for detecting the occurrence of said condition in said internal combustion engine to produce a condition detected output, and an auxiliary feedback circuit connected to said condition detecting means and in response to said condition detected output for feeding said integrated output back to an input terminal of said main feedback circuit to thereby maintain said integrated output at said predetermined value intermediate with the fluctuating range of said integrated output.

5. A fuel injection control system according to claim 4, wherein said condition detecting means detects the occurrence of the condition in that said air-fuel ratio detecting means cannot operate normally.

6. A fuel injection control system according to claim 3, wherein said air-fuel ratio detecting means includes an oxygen concentration sensor for detecting the concentration of oxygen contained in the exhaust gases of said internal combustion engine.

7. A fuel injection control system according to claim 6, wherein said holding means maintains said integrated output delivered by said integrating circuit in said main feedback circuit at said predetermined value when the temperature of the exhaust gases of said engine is below an allowable temperature at which said oxygen concentration sensor begins to operate normally.

8. A fuel injection control system according to claim 7, wherein said holding means includes condition detecting means for detecting the occurrence of a condition that the temperature of the exhaust gases of said engine is below said allowable temperature to produce a condition detected output, and an auxiliary feedback circuit connected to said condition detecting means and in response to said condition detected output for feeding said integrated output back to an input terminal of said main feedback circuit to thereby maintain said integrated output at said second predetermined value intermediate within the fluctuating range of said integrated output.

9. A fuel injection control system according to claim 3, wherein said holding means includes condition detecting means for detecting the occurrence of the condition that the supply of the fuel is cut off during deceleration of the vehicle to produce a condition detected output, and an auxiliary feedback circuit connected to said condition detecting means and in response to said condition detected output for feeding said integrated output back to an input terminal of said main feedback circuit to thereby maintain said integrated output at said predetermined value intermediate within the fluctuating range of said integrated output.

10. A fuel injection control system according to claim 3, wherein said selecting means in said main feedback circuit includes a comparator connected to said air-fuel ratio detecting means for delivering a comparison output when the output of said air-fuel ratio detecting means attains the predetermined air-fuel ratio, an adder circuit for adding at least a first detected value representing an intake state in said engine and a second detected value representing the number of revolutions of said engine and delivering a sum output thereof, and a selection circuit connected to said integration constant generating means for alternatively selecting, in accordance with the comparison output of said comparator, either one of said plus and minus integration constants.

*11. An air-fuel ratio feedback type fuel control system comprising a main feedback circuit and a holding means; said main feedback circuit including:*

*an oxygen concentration sensor for detecting the concentration of oxygen contained in the exhaust gases of a vehicle internal combustion engine;*

*a comparator for comparing the output of said oxygen concentration sensor with a first predetermined value to generate an output;*

*an adder circuit for adding at least a first detected value representing an intake state in said engine and a*

*second detected value of the number of revolutions of said engine and generating a sum output thereof;*

*an inverter connected to said adding circuit to generate an inverted output of said sum output;*

*a switching circuit connected to said comparator, said adder circuit and said inverter and responsive to the output of said comparator for selecting and generating either of said sum output and said inverted output as an output thereof;*

*an integrating circuit connected to said switching circuit for integrating the output of said switching circuit to generate an integrated output;*

*an electronically controlled fuel supply means connected to said integrating circuit and said engine and adapted for supplying a fuel amount corresponding to at least one of operating parameters of said engine, whereby fuel amount to be supplied is corrected in accordance with the output of said integrating circuit; and*

*said holding means being connected to said integrating circuit and said fuel supply means, and maintaining said integrated output at a second predetermined value except upper and lower saturation values of said integrated output when the correction of the fuel amount by said main feedback circuit is terminated.*

*12. An air-fuel ratio feedback type fuel system according to claim 11, wherein said second predetermined value is set at a substantial midpoint of the fluctuating range of said integrated output.*

*13. A fuel control system including a computing section for computing an optimum amount of fuel in accordance with parameters concerning operational conditions of an internal combustion engine in a vehicle, and fuel supplying means for supplying the fuel into said internal combustion engine in response to an output of said computing section, said computing section comprising:*

*a. a main feedback circuit including air-fuel detecting means for measuring an air-fuel ratio of gas mixture by detecting at least one component of exhaust gases of an internal combustion engine; integration constant generating means for generating a positive integration constant and a negative integration constant; selecting means connected to said air-fuel ratio detecting means and said integration constant generating means for selecting, in response to the output of said air-fuel ratio detecting means, one of said positive and negative constants in accordance with the output of said air-fuel ratio detecting means; and an integrating circuit connected to said selecting means for integrating said one of said positive and negative constants selected by said selecting means to produce an integrated output, thereby correcting the fuel amount to be supplied, and*

*b. holding means connected to said integrating circuit for maintaining the integrated output of said integrating circuit in said main feedback circuit at a predetermined value intermediate within a fluctuating range of said integrated output when there occurs in said internal combustion engine a condition that the correction function of the fuel amount by said integrating circuit in said main feedback circuit is terminated.*

*14. A fuel control system according to claim 13, wherein said holding means includes condition detecting means for detecting the occurrence of said condition in said internal combustion engine to produce a condition detected output, and an auxiliary feedback circuit connected to said condition detecting means and in response to said condition detected output for feeding said integrated output back to an input terminal of said main feedback circuit to thereby maintain said integrated output at said predetermined value intermediate with the fluctuating range of said integrated output.*

*15. A fuel control system according to claim 14, wherein said condition detecting means detects the occurrence of the condition in that said air-fuel ratio detecting means cannot operate normally.*

*16. A fuel control system according to claim 13, wherein said air-fuel ratio detecting means includes an oxygen concentration sensor for detecting the concentration of oxygen contained in the exhaust gases of said internal combustion engine.*

*17. A fuel control system according to claim 16, wherein said holding means maintains said integrated output delivered by said integrating circuit in said main feedback circuit at said predetermined value when the temperature of the exhaust gases of said engine is below an allowable temperature at which said oxygen concentration sensor begins to operate normally.*

*18. A fuel control system according to claim 17, wherein said holding means includes condition detecting means for detecting the occurrence of a condition that the temperature of the exhaust gases of said engine is below said allowable temperature to produce a condition detected output, and an auxiliary feedback circuit connected to said condition detecting means and in response to said condition detected output for feeding said integrated output back to an input terminal of said main feedback circuit to thereby maintain said integrated output at said second predetermined value intermediate within the fluctuating range of said integrated output.*

*19. A fuel control system according to claim 13, wherein said holding means includes condition detecting means for detecting the occurrence of the condition that the supply of the fuel is cut off during deceleration of the vehicle to produce a condition detected output, and an auxiliary feedback circuit connected to said condition detecting means and in response to said condition detected output for feeding said integrated output back to an input terminal of said main feedback circuit to thereby maintain said integrated output at said predetermined value intermediate within the fluctuating range of said integrated output.*

*20. A fuel control system according to claim 13, wherein said selecting means in said main feedback circuit includes a comparator connected to said air-fuel ratio detecting means for delivering a comparison output when the output of said air-fuel ratio detecting means attains the predetermined air-fuel ratio, an adder circuit for adding at least a first detected value representing an intake state in said engine and a second detected value representing the number of revolutions of said engine and delivering a sum output thereof, and a selection circuit connected to said integration constant generating means for alternatively selecting, in accordance with the comparison output of said comparator, either one of said plus and minus integration constants.*

*21. In combination with an air-fuel mixture supply controller for controlling the air-to-fuel ratio of mixture which is supplied to an internal combustion engine in accordance with engine operating conditions, a feedback control system comprising:*

*oxygen sensor means for detecting the amount of oxygen in the exhaust gas produced from said engine,*

*means including an integrator for generating an integration output which selectively increases and decreases, said integration output being applied to said air-fuel mixture controller adapted to correct the air-to-fuel*

*ratio of the mixture in response to the difference between said integration output and a predetermined constant value,*

*means connecting said oxygen sensor means to said selective integration generating means for selecting as between said increasing and decreasing integration output according to the detected amount of exhaust gas oxygen to cause correction of said air-to-fuel ratio,*

*condition detecting means for detecting at least one preselected engine operating condition where the air-to-fuel ratio is not required to be corrected in response to the output of said oxygen sensor; and*

*hold circuit means connected to be responsive to said condition detecting means for holding the integration output of said integrator at said predetermined constant value during said preselected operating condition, whereby correction of the air-to-fuel ratio is automatically made zero while correction of the air-to-fuel ratio is not required.*

*22. A feedback control system according to claim 21 wherein said predetermined constant value is set between the upper limit and the lower limit of the integration output of said integrator.*

* * * * *